United States Patent
Okazaki (10) Patent No.: US 10,279,428 B2
(45) Date of Patent: May 7, 2019

(54) LASER BLANKING APPARATUS AND PROCESSING METHOD USING SAME

(71) Applicant: HITACHI ZOSEN FUKUI CORPORATION, Awara-shi, Fukui (JP)

(72) Inventor: Akira Okazaki, Awara (JP)

(73) Assignee: HITACHI ZOSEN FUKUI CORPORATION, Awara-shi, Fukui (JP)

( * ) Notice: Subject to any disclaimer, the term of this patent is extended or adjusted under 35 U.S.C. 154(b) by 76 days.

(21) Appl. No.: 14/917,518

(22) PCT Filed: Feb. 8, 2014

(86) PCT No.: PCT/JP2014/000684
§ 371 (c)(1),
(2) Date: Mar. 8, 2016

(87) PCT Pub. No.: WO2015/037162
PCT Pub. Date: Mar. 19, 2015

(65) Prior Publication Data
US 2016/0214207 A1    Jul. 28, 2016

(30) Foreign Application Priority Data
Sep. 12, 2013   (JP) .............................. 2013-189725

(51) Int. Cl.
*B23K 26/08*   (2014.01)
*B23K 26/38*   (2014.01)

(52) U.S. Cl.
CPC ...... *B23K 26/0838* (2013.01); *B23K 26/0846* (2013.01); *B23K 26/38* (2013.01)

(58) Field of Classification Search
CPC . B23K 26/0838; B23K 26/0846; B23K 26/38
(Continued)

(56) References Cited

U.S. PATENT DOCUMENTS

| 4,266,112 A * | 5/1981 | Niedermeyer ..... B23K 26/0846 219/121.72 |
| 6,592,693 B1 * | 7/2003 | Nedblake ........... B23K 26/0846 156/247 |

(Continued)

FOREIGN PATENT DOCUMENTS

| JP | 10-34485 A | 2/1998 |
| JP | 2002-35967 A | 2/2002 |

(Continued)

OTHER PUBLICATIONS

International Search Report of PCT/JP2014/000684.
Written opinion of PCT/JP2014/000684.

*Primary Examiner* — Dana Ross
*Assistant Examiner* — Ket D Dang
(74) *Attorney, Agent, or Firm* — Muncy, Geissler, Olds & Lowe, P.C.

(57) ABSTRACT

While conveying a flat plate material X, a laser blanking apparatus 100 for cutting the plate material X into a blank material with laser light emitted from a laser nozzle 11 includes an endless conveyor 1 for feeding the plate material X, a pair of upstream and downstream support rollers 21a and 21b provided below the laser nozzle 11, and a drawing roller 21c provided below the upstream and downstream support rollers 21a and 21b, wherein the upstream and downstream support rollers 21a and 21b and the drawing roller 21c guide the endless conveyor 1.

12 Claims, 5 Drawing Sheets

(58) Field of Classification Search
USPC ............ 219/121.72, 121.44, 121.66, 121.58,
219/121.6, 121.85, 121.67, 121.68,
219/121.69, 121.7, 121.71, 121.82;
29/34 R, 564, 33 C, 33 Q, 650;
242/535.4, 538.2, 564.3; 226/1, 95, 170;
198/597, 832, 617
See application file for complete search history.

(56) References Cited

U.S. PATENT DOCUMENTS

| | | | | |
|---|---|---|---|---|
| 8,076,610 | B2* | 12/2011 | Gattiglio | B23K 26/08 |
| | | | | 219/121.6 |
| 2004/0237735 | A1* | 12/2004 | Diem | B23K 26/0838 |
| | | | | 83/13 |
| 2006/0118529 | A1* | 6/2006 | Aoki | B23K 26/0846 |
| | | | | 219/121.67 |
| 2008/0168876 | A1* | 7/2008 | Kilian | B23K 26/0838 |
| | | | | 83/424 |
| 2008/0179304 | A1* | 7/2008 | Osako | B23K 26/0846 |
| | | | | 219/121.85 |
| 2010/0186562 | A1* | 7/2010 | Schaferling | B23D 45/046 |
| | | | | 83/13 |

FOREIGN PATENT DOCUMENTS

| | | |
|---|---|---|
| JP | 2004-50184 A | 2/2004 |
| JP | 2009-131927 A | 6/2009 |
| JP | 4705139 B2 | 6/2011 |

* cited by examiner

LASER BLANKING APPARATUS AND PROCESSING METHOD USING SAME

TECHNICAL FIELD

The present invention relates to laser blanking apparatuses and processing methods using the same and, more particularly, to a laser blanking apparatus that saves space, is simple in structure, and yet is capable of cutting a plate material such as a steel plate into a desired shape at a desired position without causing misalignment and a processing method using the same.

BACKGROUND ART

In press working, generally, a flat plate material unwound from a coiled plate material is cut by a shearing apparatus into a blank material, and the blank material is pressed.

Specifically, the shearing apparatus cuts the plate material into a certain shape by putting the plate material between its upper and lower blades (for example, see Patent Literature 1), and then the blank material is conveyed to a press machine pressed into a desired three-dimensional shape.

Incidentally, in the case of a conventional shearing apparatus, the shape of a blank material depends on the shapes of its upper and lower blades; therefore, from the viewpoint of processing accuracy of the blades, the blank material cannot be formed into a complicated shape. This causes a large number of unwanted parts to be left, thus reducing production efficiency.

Further, with a high likelihood of leaving burrs, such blank materials leave a space between them when joined on top of each other into a stack, and the space causes an increase in height of the stack, which in turn poses a risk of tilting the whole stack.

Furthermore, the need to temporarily stop the plate material in cutting the plate material makes it hard to say that productivity is necessarily excellent.

Incidentally, a laser blanking apparatus that cuts a plate material with use of laser light has recently been under development. Use of this apparatus offers an advantage in that program control of movement of the apparatus with use of laser light makes it possible to precisely cut a plate material into a desired shape and reduces the likelihood of leaving burrs.

A known example of such an apparatus is a laser cutting apparatus including: material transporting means for transporting a plate-shaped material in a feed direction; head moving means for moving a processing head that is capable of emitting laser light; upstream supporting means for supporting the material being transported; and downstream supporting means for supporting a cut part obtained by cutting, wherein the upstream supporting means is constituted by a roller conveyor mechanism, and the downstream supporting means is constituted by a belt conveyor mechanism (for example, see Patent Literature 2).

CITATION LIST

Patent Literature

PTL 1: Japanese Patent Application Laid-Open No. 2009-131927
PTL 2: Japanese Patent No. 4705139

SUMMARY OF INVENTION

Technical Problem

However, the laser cutting apparatus described in Patent Literature 2, which requires the roller conveyor mechanism and the belt conveyor mechanism, requires a large space and is also difficult to install.

Further, misalignment of a plate material or a blank material may occur, as it is necessary to synchronize the roller conveyor mechanism and the belt conveyor mechanism with each other and transfer the plate material (after cutting, the blank material) from the roller conveyor mechanism to the belt conveyor mechanism.

Furthermore, processing may be confined to a position between the roller conveyor mechanism and the belt conveyor mechanism. This makes it necessary to stop the plate material or transport the plate material at a low speed in cutting the plate material, thus making it hard to say that productivity is necessarily excellent.

The present invention has been made in view of these circumstances, and it is an object of the present invention to provide a laser blanking apparatus that saves space, is easy to install, and yet is capable of, while conveying the plate material, laser-processing a plate material into a desired shape without causing misalignment and a processing method using the same.

Solution to Problems

The inventor of the present invention diligently studied in order to solve the problems described above. As a result, the inventor found that the problems can be solved by using a single endless conveyor, providing a drawing roller below upstream and downstream support rollers provided below a laser nozzle, configuring these rollers to guide the endless conveyor. Thus, the inventor finally accomplished the present invention.

The present invention is directed to a laser blanking apparatus that, while conveying a flat plate material, cuts the plate material into a blank material with laser light emitted from a laser nozzle, including: the laser nozzle; an endless conveyor for feeding the plate material; a pair of upstream and downstream support rollers provided below the laser nozzle; and a drawing roller provided below the upstream and downstream support rollers, wherein the upstream and downstream support rollers and the drawing roller guide the endless conveyor.

The present invention is directed to the laser blanking apparatus discussed above, wherein the upstream and downstream support rollers and the drawing roller are integrally movable in a direction of movement of the endless conveyor.

The present invention is directed to the laser blanking apparatus discussed above, wherein the upstream and downstream support rollers and the drawing roller are capable of each independently changing from one position to another.

The present invention is directed to the laser blanking apparatus discussed above, further including a tension adjustment roller for adjusting tension.

The present invention is directed to the laser blanking apparatus discussed above, further including: an X-axis rail attached above the endless conveyor in such a way as to be orthogonal to the direction of movement of the endless conveyor; and Y-axis rails attached to both right and left edges, respectively, of the endless conveyor in such a way as to extend along the direction of movement of the endless conveyor, wherein the laser nozzle is movable along the X-axis rail, and the X-axis rail is movable along the Y-axis rails.

The present invention is directed to the laser blanking apparatus discussed above, wherein the X-axis rail, the upstream and downstream support rollers, and the drawing roller are integrated with one another.

The present invention is directed to the laser blanking apparatus discussed above, further including a sputter receiving box placed between the upstream and downstream support rollers.

The present invention is directed to the laser blanking apparatus discussed above, further including antivibration means attached around the laser nozzle for dampening vibration of the plate material during laser processing.

The present invention is directed to a processing method using a laser blanking apparatus discussed above, including: emitting laser light while moving the laser nozzle; and moving the upstream and downstream support rollers and the drawing roller so that the upstream and downstream support rollers and the drawing roller follow a movement of the laser nozzle in a direction of movement of the endless conveyor.

Advantageous Effects of Invention

The laser blanking apparatus of the present invention uses only one endless conveyor, and as such, the laser blanking apparatus saves space and is easy to install.

The laser blanking apparatus laser-processes a plate material while conveying the plate material with one endless conveyor. This makes it possible to prevent misalignment of the plate material during conveyance or laser processing. This in turn makes it possible to cut the plate material into a desired shape with high precision.

Further, since the laser blanking apparatus cuts the plate material with laser light emitted from the laser nozzle while conveying the plate material, the laser blanking apparatus is also excellent in productivity.

In the laser blanking apparatus of the present invention, the drawing roller is provided below the upstream and downstream support rollers provided below the laser nozzle, and the endless conveyor is guided by these rollers. This makes it possible to form a sufficient space between the upstream and downstream support rollers provided below the laser nozzle. With this, even if laser processing is performed with the laser nozzle, a given space is formed directly below the plate material, on which laser processing is performed. This makes it possible to prevent the endless conveyor from being damaged by laser light.

Further, since the space can be formed in any position, processing is not confined to any position.

Furthermore, the sputtering receiving box can be placed in the space formed between the upstream and downstream support rollers. This makes it possible to collect sputter generated during laser processing.

In the laser blanking apparatus of the present invention, the upstream and downstream support rollers and the drawing roller are integrally movable in the direction of movement of the endless conveyor, and as such, these rollers can move to follow the movement of the laser nozzle. This makes it possible to perform laser processing with the laser nozzle being largely moved back and forth. That is, a region in which laser processing is possible can be greatly expanded, and this also makes it possible to increase the speed of conveyance of the plate material.

In the laser blanking apparatus of the present invention, the upstream and downstream support rollers and the drawing roller are capable of each independently changing from one position to another. This makes it possible to change the positions of these rollers according to the thickness of the plate material, the intensity of the laser light, the size of the after-mentioned sputter receiving box, and the like.

Further, by moving one end of the drawing roller back and forth without moving the other end, an adjustment can be made in a case where the belt of the endless conveyor meanders.

By including the tension adjustment roller for adjusting tension, the laser blanking apparatus of the present invention can prevent trouble from happening due to a defect in tension of the endless conveyor.

In the laser blanking apparatus of the present invention, the laser nozzle is movable along the X-axis rail, and the X-axis rail is movable along the Y-axis rail. Therefore, full use of a combination of these components enables the laser nozzle to move in any direction such as a frontward or backward direction, a rightward or leftward direction, a slanting direction, or a curving direction. This allows the plate material being conveyed to be laser-processed into a complicated shape.

In the laser blanking apparatus of the present invention, the X-axis rail, the upstream and downstream support rollers, and the drawing roller are integrated with one another and therefore move at the same time. This prevents misalignment between the position of laser processing by the laser nozzle and the position of the space formed between the upstream and downstream support rollers.

By including the antivibration means attached around the laser nozzle for dampening vibration of the plate material during laser processing, the laser blanking apparatus of the present invention can more accurately perform laser processing.

In the processing method using a laser blanking apparatus of the present invention, the aforementioned laser blanking apparatus is used to irradiate a plate material with laser light while moving the laser nozzle. This makes it possible to laser-process the plate material into a desired shape without causing misalignment while conveying the plate material.

Further, by causing the upstream and downstream support rollers and the drawing roller as a whole to move to follow the movement of the laser nozzle in the direction of movement of the endless conveyor, the endless conveyor can be prevented from being damage by laser light.

DESCRIPTION OF EMBODIMENTS

A preferred embodiment of the present invention is described in detail below with reference to the drawings as needed. In the drawings, the same components are given the same reference signs, and repetition of the same descriptions is omitted. Further, unless otherwise noted, positional relationships such as top and bottom, left and right are based on those shown in the drawings. Furthermore, the dimensional ratios of the drawings are not limited to those shown in the drawings.

A laser blanking apparatus of the present invention is an apparatus that, while conveying a flat plate material, cuts the plate material into a blank material of a desired shape with laser light emitted from a laser nozzle.

Note here that the laser light is not limited to a particular type of laser light, but usable examples of the laser light include a solid-state laser, a liquid laser, a gas laser, a semiconductor laser, a free electron laser, a metal vapor laser, and a chemical laser.

Further, the plate material may be made of metal such as iron, aluminum, titanium, or magnesium. Alternatively, the plate material may be made, for example, of glass, ceramic, resin, or any combination of these materials, provided the plate material can be cut with laser light.

The laser blanking apparatus of the present invention is high in cutting efficiency and excellent in productivity, as it laser-processes a plate material while conveying the plate material.

Figure 1:
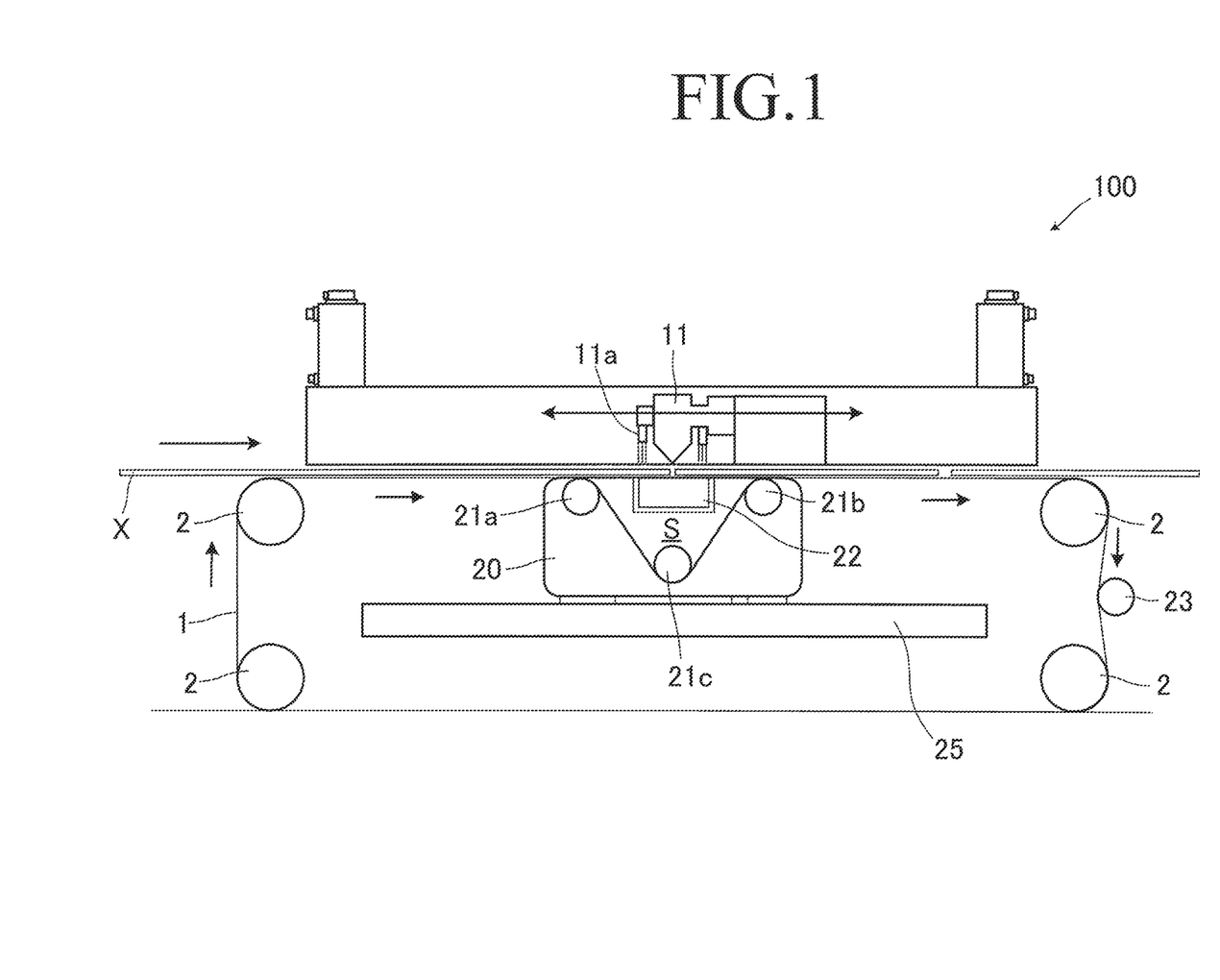
FIG. 1 is a side view schematically showing a laser blanking apparatus according to the present embodiment.

FIG. 1 is a side view schematically showing a laser blanking apparatus according to the present embodiment.

As shown in FIG. 1, a laser blanking apparatus 100 according to the present embodiment includes: a laser nozzle 11 that irradiates a plate material X with laser light; antivibration means 11a located around the laser nozzle 11 for dampening vibration of the plate material X during laser processing; an endless conveyor 1 for feeding the plate material X; a plurality of guide rollers 2 that guide the endless conveyor 1; a pair of upstream and downstream support rollers 21a and 21b provided below the laser nozzle 11; a drawing roller 21c provided below the upstream and downstream support rollers 21a and 21b, a tension adjustment roller 23 for adjusting the tension of the endless conveyor 1; and a sputter receiving box 22 placed in a space S between the upstream and downstream support rollers 21a and 21b.

Moreover, the endless conveyor 1 is guided by the plurality of guide rollers 2, the upstream and downstream support rollers 21a and 21b, and the drawing roller 21c.

In the laser blanking apparatus 100, the plate material X is conveyed from an upstream side to a downstream side by the endless conveyor 1 and, on the endless conveyor 1, laser-processed with use of the laser nozzle 11.

The laser blanking apparatus 100 uses only one endless conveyor 1, and as such, it saves space and is very easy to install.

Further, since the plate material X is finished with laser processing while being conveyed by one endless conveyor 1, the plate material X does not need at all, for example, to be transferred during conveyance or laser processing. This makes it possible to prevent misalignment of the plate material X. This in turn makes it possible to cut the plate material X into a desired shape with high precision.

In the laser blanking apparatus 100, the antivibration means 11a is attached in such a way as to surround the laser nozzle 11.

Further, the antivibration means 11a applies contact pressure to the plate material to dampen vibration of a blank material during laser processing.

Furthermore, the antivibration means 11a is fixed to a frame to which the laser nozzle 11 is attached, so as to horizontally move together with the laser nozzle 11.

While, in the laser blanking apparatus according to the present embodiment, the laser nozzle 11 is configured to movable in any direction such as a forward or backward direction, a rightward or leftward direction, or a slanting direction, such provision of the antivibration means 11a around the laser nozzle 11 offers an advantage in that vibration can be dampened in all directions and laser processing can be accurately performed.

It should be noted that examples of the antivibration means 11a include, but are not limited to, a contact pressure brush.

In the laser blanking apparatus 100, the pair of upstream and downstream support rollers 21a and 21b are provided between the upstream and downstream rollers 2 located below the laser nozzle 11, with which laser processing is performed. Moreover, laser processing is performed between the upstream and downstream support rollers 21a and 21b.

Further, since the drawing roller 21c is provided below the upstream and downstream support rollers 21a and 21b, the space S is necessarily formed between the upstream and downstream support rollers 21a and 21b and the drawing roller 21c.

In the laser blanking apparatus 100 according to the present embodiment, even if laser processing is performed with the laser nozzle 11, a given space S for escape is formed directly below the plate material X, on which laser processing is performed. This makes it possible to surely prevent the endless conveyor 1, which is guided by the upstream and downstream support rollers 21a and 21b and the drawing roller 21c, from being damaged by laser light. It should be noted that since the space S can be formed in any position, processing is not confined to any position.

In the laser blanking apparatus 100, the upstream and downstream support rollers 21a and 21b and the drawing roller 21c are capable of each independently changing from one position to another. That is, these rollers can be each independently moved in a frontward or backward direction, an upward or downward direction, a slanting direction, or any other direction according to the thickness of the plate material, the intensity of the laser light, the size of the after-mentioned sputter receiving box, and the like and fixed in set position.

Further, the upstream and downstream support rollers 21a and 21b and the drawing roller 21c have shafts whose angles are variable.

For example, only the angle of the drawing roller 21c can be varied by tilting the shaft of the drawing roller 21c frontward or backward. This makes it possible to, in case of misalignment of the belt of the endless conveyor, adjust the belt back into its original position.

The laser blanking apparatus 100 includes the tension adjustment roller 23 for adjusting tension. This makes it possible to prevent trouble from happening due to a defect in tension of the endless conveyor.

In the laser blanking apparatus 100, the sputter receiving box 22 is placed in the space S. That is, the sputter receiving box 22 is placed in the space S between the laser nozzle 11 and the endless conveyor 1.

The sputter receiving box 22 is in the shape of a box extending in a direction orthogonal to a direction of movement of the endless conveyor 1, and is capable of collecting sputter generated during laser processing. It should be noted that a fume collector (dust collector; not illustrated) is attached to the sputter receiving box 22 so as to suck and collect sputter stored in the sputter receiving box 22.

In the laser blanking apparatus 100, the upstream and downstream support rollers 21a and 21b, the drawing roller 21c, and the sputter receiving box 22 are all positioned at arbitrary positions in movable bases 20, coupled to the movable bases 20, and supported by the movable bases 20. The movable bases 20 are provided at both right and left edges, respectively, of the endless conveyor 1 (in a direction perpendicular to the paper plane in FIG. 1).

Moreover, the movable bases 20 are movable along a pair of lower Y-axis rails 25 attached to both the right and left edges, respectively, of the endless conveyor in such a way as to extend along the direction of movement of the endless conveyor. That is, the movable base 20 enable the upstream and downstream support rollers 21a and 21b, the drawing roller 21c, and the sputter receiving box 22 to integrally move along the lower Y-axis rails 25 in the direction of movement of the endless conveyor 1. It should be noted that the lower Y-axis rails 25 are attached to a machine casing.

As such, even in a case where laser processing is performed with the laser nozzle 11 being largely moved back and forth, the movable bases 20 allows the space S to move to follow the movement of the laser nozzle 11. This makes it possible to greatly expand a region in which laser processing is possible. It should be noted that details will be described below.

This also makes it possible to increase the speed of conveyance of the plate material.

Figure 2:
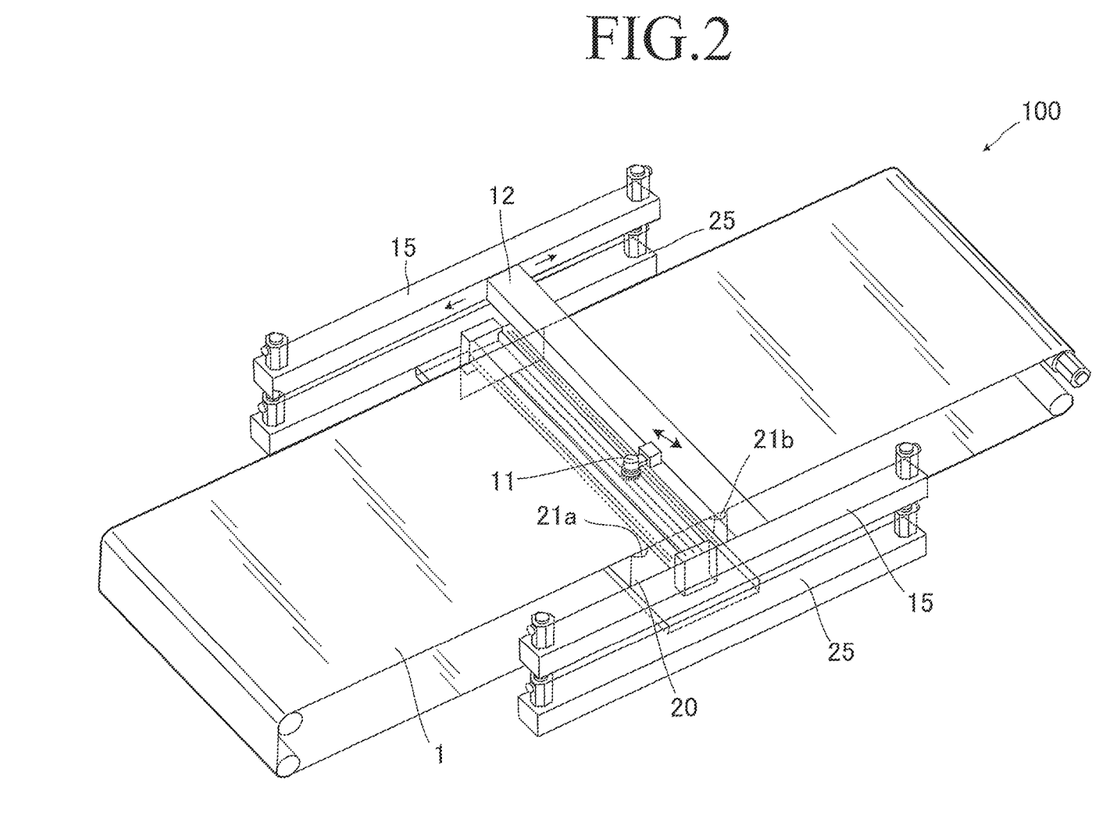
FIG. 2 is a perspective view schematically showing the laser blanking apparatus according to the present embodiment.

FIG. 2 is a perspective view schematically showing the laser blanking apparatus according to the present embodiment. It should be noted that FIG. 2 omits to illustrate the plate material X.

As shown in FIG. 2, in the laser blanking apparatus 100, an X-axis rail 12 is attached above the endless conveyor 1 in such a way as to be orthogonal to the direction of movement of the endless conveyor 1, and the laser nozzle 11 is movable along the X-axis rail 12.

Further, a pair of Y-axis rails 15 are attached to both edges, respectively, of the endless conveyor 1 in such a way as to extend along the direction of movement of the endless conveyor 1, and the X-axis rail 12 is movable in the direction of movement of the endless conveyor 1. It should be noted that the Y-axis rails 15 are disposed above the lower Y-axis rails 25 in such a way as to be parallel to the lower Y-axis rails 25. Further, the X-axis rail 12 and the Y-axis rails 15 are attached to the machine casing (not illustrated).

In the laser blanking apparatus 100, the laser nozzle 11 is movable along the X-axis rail 12, and the X-axis rail 12 is movable along the Y-axis rails 15. Therefore, program control of a combination of these components enables the plate material being conveyed to be laser-processed in any direction such as a frontward or backward direction, a rightward or leftward direction, a slanting direction, or a curving direction.

Next, a processing method using the laser blanking apparatus 100 is described by way of examples.

FIGS. 3(a) to 3(d) are schematic views showing a first example of laser processing of a plate material with use of the laser blanking apparatus according to the present embodiment. In this example, the laser nozzle 11 moves along the X-axis rail 12, and the X-axis rail 12 is fixed. It should be noted that FIGS. 3(a) to 3(d) omit to illustrate the antivibration means 11a.

Figure 3A:
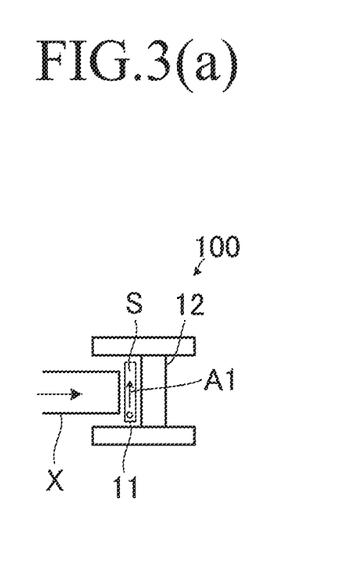
FIG. 3(a) is a schematic view showing a first example of laser processing of a plate material with use of the laser blanking apparatus according to the present embodiment.

First, as shown in FIG. 3(a), in the laser blanking apparatus 100, a flat plate material X unwound, for example, from a coil is continuously conveyed by the endless conveyor (not illustrated).

Figure 3B:
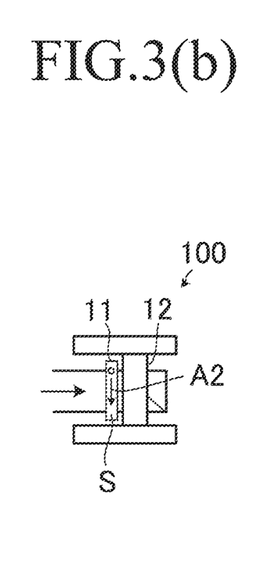
FIG. 3(b) is a schematic view showing the first example of laser processing of a plate material with use of the laser blanking apparatus according to the present embodiment.

Then, the laser nozzle 11 moves along the X-axis rail 12 and in the direction of the arrow A1 while emitting laser light. This causes the plate material X to be cut in a slanting direction as shown in FIG. 3(b). It should be noted that the space S formed by the upstream and downstream support rollers and the drawing roller does not move.

Figure 3C:
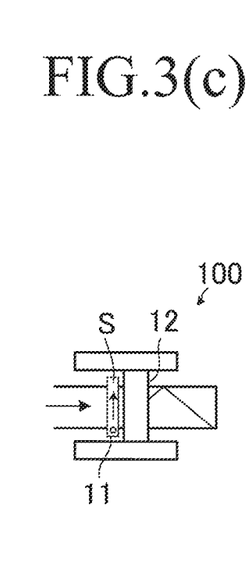
FIG. 3(c) is a schematic view showing the first example of laser processing of a plate material with use of the laser blanking apparatus according to the present embodiment.

Next, the laser nozzle 11 moves along the X-axis rail 12 and in the direction of the opposite arrow A2 while continuously emitting laser light. This causes the plate material X to be cut in the shape of a V as shown in FIG. 3(c). It should be noted that the space S formed by the upstream and downstream support rollers and the drawing roller does not move.

Figure 3D:
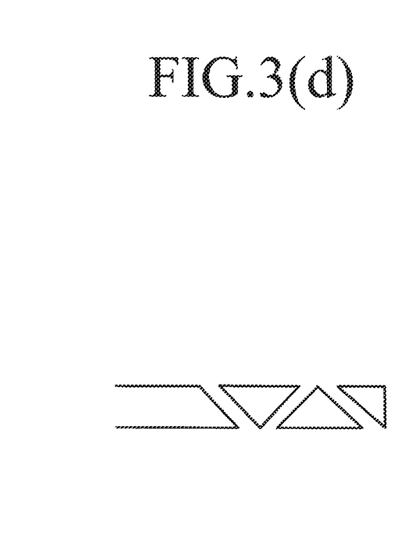
FIG. 3(d) is a schematic view showing the first example of laser processing of a plate material with use of the laser blanking apparatus according to the present embodiment.

Repetition of this operation causes the plate material X to be cut in a slanting direction and the opposite slanting direction into triangular blank materials as shown in FIG. 3(d).

FIGS. 4(a) to 4(d) are schematic views showing a second example of laser processing of a plate material with use of the laser blanking apparatus according to the present embodiment. In this example, the laser nozzle 11 moves along the X-axis rail 12, and the X-axis rail 12 moves along the Y-axis rails 15.

Figure 4A:
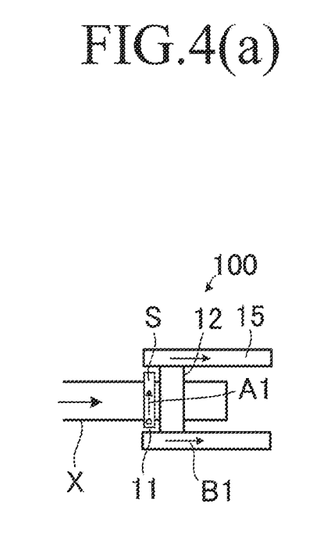
FIG. 4(a) is a schematic view showing a second example of laser processing of a plate material with use of the laser blanking apparatus according to the present embodiment.

First, as shown in FIG. 4(a), in the laser blanking apparatus 100, a flat plate material X unwound, for example, from a coil is continuously conveyed by the endless conveyor (not illustrated).

Then, the laser nozzle 11 moves along the X-axis rail 12 and in the direction of the arrow A1 while emitting laser light, and the X-axis rail 12 moves along the Y-axis rails 15 and in the direction of the arrows B1. Let it be assumed here that the X-axis rail 12 moves at the same speed as the endless conveyor 1. This causes the plate material X to be cut in a vertical direction. At this point in time, the upstream and downstream support rollers and the drawing roller move along the lower Y-axis rail 25 to follow the movement of the X-axis rail. That is, the space S formed the upstream and downstream support rollers and the drawing roller move to follow the movement of the X-axis rail.

Figure 4B:
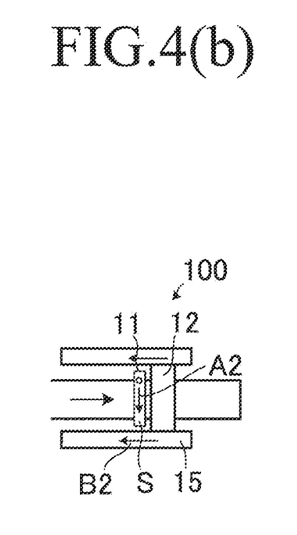
FIG. 4(b) is a schematic view showing the second example of laser processing of a plate material with use of the laser blanking apparatus according to the present embodiment.
Figure 4C:
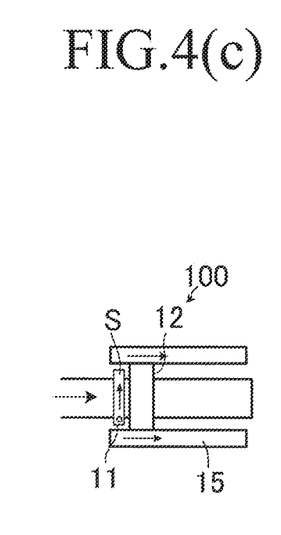
FIG. 4(c) is a schematic view showing the second example of laser processing of a plate material with use of the laser blanking apparatus according to the present embodiment.

Next, the laser nozzle 11 stops emitting laser light. Then, as shown in FIG. 4(b), the laser nozzle 11 moves along the X-axis rail 12 and in the direction of the opposite arrow A2, and the X-axis rail 12 moves along the Y-axis rails 15 and in the direction of the opposite arrows B2. This causes the laser nozzle 11 and the X-axis rail 12 to return to their original positions as shown in FIG. 4(c). At this point in time, the upstream and downstream support rollers and the drawing roller move along the lower Y-axis rail 25 to follow the movement of the X-axis rail. That is, the space S formed the upstream and downstream support rollers and the drawing roller move to follow the movement of the X-axis rail.

Figure 4D:
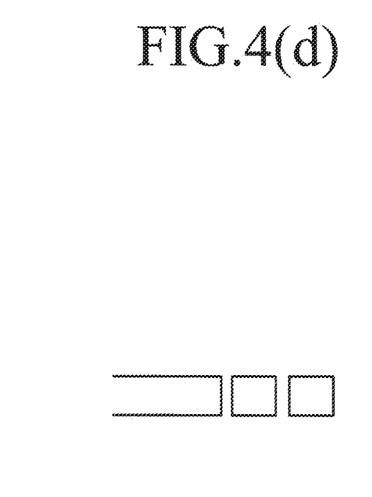
FIG. 4(d) is a schematic view showing the second example of laser processing of a plate material with use of the laser blanking apparatus according to the present embodiment.

Repetition of this operation causes the plate material X to be cut in a vertical direction into rectangular blank materials as shown in FIG. 4(d).

In the processing method using the laser blanking apparatus 100 according to the present embodiment, the laser nozzle 11 irradiates the plate material X with laser light while moving. This makes it possible to laser-process the plate material X into a desired shape without causing misalignment while conveying the plate material X.

Further, by causing the space S formed by the upstream and downstream support rollers 21a and 21b and the drawing roller 21c to move to follow the movement of the laser nozzle 11 in the direction of movement of the endless conveyor 1, the endless conveyor 1 is allowed to escape and prevented from being damaged by laser light.

The foregoing has described a preferred embodiment of the present invention. However, the present invention is not limited to the embodiment described above.

For example, in the laser blanking apparatus 100 according to the present embodiment, the endless conveyor 1 is a single belt. Alternatively, the endless conveyor 1 may be divided.

The processing method using the laser blanking apparatus 100 according to the present embodiment is not limited to the first example (see FIGS. 3(a) to 3(d)), in which the laser nozzle 11 moves along the X-axis rail 12, or the second example (see FIGS. 4(a) to 4(d)), in which the laser nozzle 11 moves along the X-axis rail 12 and the X-axis rail 12 moves along the Y-axis rail 15. Of course, it is possible to form a blank material into a complicated shape by causing the laser nozzle 11 and the X-axis rail 12 to move in a complicated way under program control.

In the laser blanking apparatus 100 according to the present embodiment, the X-axis rail 12, the upstream and downstream support rollers 21a and 21b, and the drawing roller 21c may be integrated with one another. In this case, the X-axis rail 12, the upstream and downstream support rollers 21a and 21b, and the drawing roller 21c move at the same time. This prevents misalignment between the position of laser processing by the laser nozzle 11 and the position of the predetermined space S formed between the upstream and downstream support rollers 21a and 21b. It should be noted that the X-axis rail 12 moves along the Y-axis rails 15, and the X-axis rail 12, the upstream and downstream support rollers 21a and 21b, and the drawing roller 21c move along the lower Y-axis rails.

In the laser blanking apparatus 100 according to the present embodiment, the X-axis rail 12, one drawing roller 21c is provided below the upstream and downstream support rollers 21a and 21b. Alternatively, a plurality of drawing rollers may be provided.

Figure 5A:
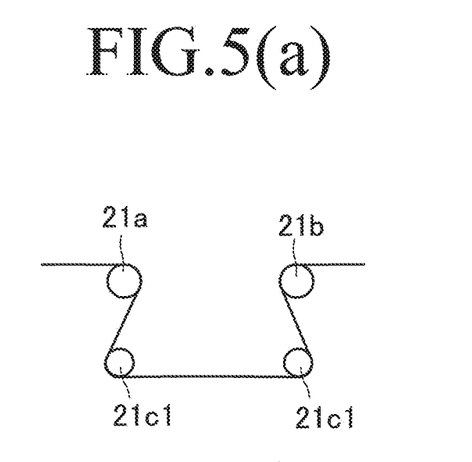
FIG. 5(a) is a side view schematically showing an upstream support roller, a downstream support roller, and a drawing roller of a laser blanking apparatus according to another embodiment.
Figure 5B:
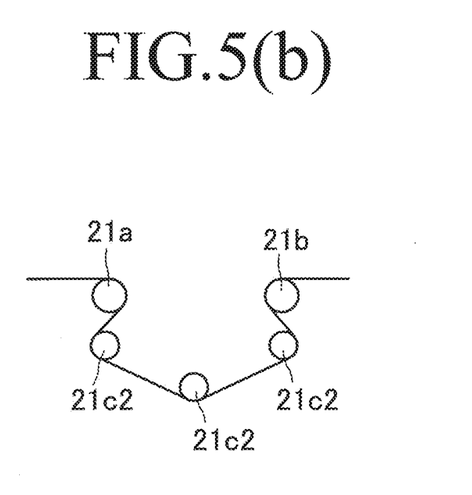
FIG. 5(b) is a side view schematically showing an upstream support roller, a downstream support roller, and a drawing roller of a laser blanking apparatus according to another embodiment.

FIGS. 5(a) and 5(b) are each a side view schematically showing an upstream support roller, a downstream support roller, and a drawing roller of a laser blanking apparatus according to another embodiment.

For example, as shown in FIG. 5(a), two drawing rollers 21c1 may be provided, or as shown in FIG. 5(b), three drawing rollers 21c2 may be provided.

In these cases, a more sufficient space can be surely formed between the upstream and downstream support rollers 21a and 21b below the laser nozzle. It should be noted that even in a case where a plurality of drawing rollers are provided, the drawing rollers are capable of each independently changing from one position to another.

INDUSTRIAL APPLICABILITY

The present invention is used as a laser blanking apparatus that cuts a plate material into a blanking material of a desired shape. A laser blanking apparatus of the present invention saves space, is easy to install, and yet is capable of laser-processing a plate material into a desired shape without causing misalignment while conveying the plate material.

REFERENCE SIGNS LIST

1 . . . endless conveyor
2 . . . guide roller
11 . . . laser nozzle
11a . . . antivibration means
12 . . . X-axis rail
15 . . . Y-axis rail
20 . . . movable base
21a . . . upstream support roller
21b . . . downstream support roller
21c, 21c1, 21c2 . . . drawing roller
22 . . . sputter receiving box
25 . . . lower Y-axis rail
100 . . . laser blanking apparatus
S . . . space
X . . . plate material

The invention claimed is:

1. A laser blanking apparatus that, while conveying a plate material, cuts and turns the plate material into a blank material with laser light emitted from a laser nozzle, comprising:
the laser nozzle that is arranged to emit the laser light downward;
one endless conveyor for feeding the plate material, which is conveyed along a conveyance path in a conveyance direction;
a pair of upstream and downstream support rollers provided below the laser nozzle, the upstream and downstream support rollers being defined with respect to the conveyance direction; and
a drawing roller provided below the upstream and downstream support rollers,
wherein the upstream and downstream support rollers and the drawing roller guide the endless conveyor,
the upstream and downstream support rollers are placed inside the endless conveyor,
the drawing roller is placed outside the endless conveyor, and a space (S) is formed between the upstream and downstream support rollers and the drawing roller, a sputter receiving box is provided in the space with the endless conveyor located below the sputter receiving box, the endless conveyor being guided by the drawing roller between the upstream and downstream support rollers, the sputter receiving box, the upstream and downstream support rollers and the drawing roller are integrally moveable in the conveyance direction, and the conveyance path linearly runs from a top of the downstream support roller to a top of the upstream support roller such that laser processing for cutting the plate material is performed on the conveyance path that is positioned between the upstream and downstream support rollers.

2. The laser blanking apparatus according to claim 1, wherein the upstream and downstream support rollers and the drawing roller are capable of each independently changing from one position to another.

3. The laser blanking apparatus according to claim 1, further comprising a tension adjustment roller for adjusting tension.

4. The laser blanking apparatus according to claim 1, further comprising:

an X-axis rail attached above the endless conveyor in such a way as to be orthogonal to the conveyance direction; and Y-axis rails attached to both right and left edges, respectively, of the endless conveyor in such a way as to extend along the conveyance direction, wherein the laser nozzle is movable along the X-axis rail, and the X-axis rail is movable along the Y-axis rails.

5. The laser blanking apparatus according to claim 4, wherein the sputter receiving box has an empty hollow inside and an open plane connecting to the hollow at its top, the open plane having a larger width than a width of the endless conveyer, the open plane of the sputter receiving box is arranged to face the laser nozzle such that the open plane of the sputter receiving box entirely covers the endless conveyer from the right edge to the left edge, and sputters generated by the laser processing, which is performed with the laser nozzle as moving along the X-axis rail, are collected in the sputter receiving box through the open plane wherever the laser nozzle is positioned on the X-axis rail, the sputter receiving box, the upstream and downstream support rollers and the drawing roller are formed in a movable base, and the movable base is configured to move upstream or downstream in the conveyance direction in correspondence with a movement of the X-axis rail such that the space and the sputter receiving box are always positioned below the laser nozzle wherever the X-axis rail is positioned on the conveyance path.

6. The laser blanking apparatus according to claim 1, wherein an X-axis rail, the upstream and downstream support rollers, and the drawing roller are integrated with one another.

7. The laser blanking apparatus according to claim 1, further comprising a contact pressure brush attached around the laser nozzle for dampening vibration of the plate material during laser processing.

8. The laser blanking apparatus according to claim 1, wherein the upstream support roller is arranged parallel to the downstream support roller, the space (S) is determined by being surrounded with the upstream and downstream support rollers and the drawing roller.

9. The laser blanking apparatus according to claim 1, further comprising:

one or more other drawing rollers which are identical to the drawing roller, are placed outside the endless conveyor, and guide the endless conveyor, wherein the space (S) is determined with the one or more other drawing rollers in addition to the upstream and downstream support rollers and the drawing roller.

10. A processing method using a laser blanking apparatus that comprises a laser nozzle that is arranged to emit laser light downward, one endless conveyor for feeding a plate material, which is conveyed along a conveyance path in a conveyance direction, a pair of upstream and downstream support rollers provided below the laser nozzle, the upstream and downstream support rollers being defined with respect to the conveyance direction, a drawing roller provided below the upstream and downstream support rollers, and a sputter receiving box that has an empty hollow inside and an open plane connecting to the empty hollow at its top, wherein the upstream and downstream support rollers and the drawing roller guide the endless conveyor, a space (S) is formed between the upstream and downstream support rollers and the drawing roller, the sputter receiving box is provided inside the space, the open plane of the sputter receiving box is arranged to face the laser nozzle, and the sputter receiving box, the upstream and downstream support rollers and the drawing roller are assembled as a unit to move together upstream or downstream in the conveyance direction such that a positional relationship among the sputter receiving box, the upstream and downstream support rollers and the drawing roller are stable wherever the unit is positioned on the conveyance path, the conveyance path linearly runs from a top of the downstream support roller to a top of the upstream support roller such that laser processing for cutting the plate material is performed on the conveyance path between the upstream and downstream support rollers, the processing method comprising:

emitting the laser light while the laser nozzle makes a movement; and moving the upstream and downstream support rollers and the drawing roller so that the upstream and downstream support rollers and the drawing roller follow the movement of the laser nozzle in the conveyance direction.

11. The processing method according to claim 10, wherein the upstream and downstream support rollers are placed inside the endless conveyor, and the drawing roller is placed outside the endless conveyor.

12. The processing method according to claim 11, wherein the sputter receiving box, the upstream and downstream support rollers and the drawing roller are configured to move upstream or downstream in the conveyance direction in correspondence with the movement of the laser nozzle, and when moving the upstream and downstream support rollers and the drawing roller in the conveyance direction, the sputter receiving box also moves together with these rollers such that the sputter receiving box is always positioned below the laser nozzle.

\* \* \* \* \*